United States Patent [19]

Stevens et al.

[11] Patent Number: 4,787,813
[45] Date of Patent: Nov. 29, 1988

[54] INDUSTRIAL ROBOT FOR USE IN CLEAN ROOM ENVIRONMENT

[75] Inventors: Craig L. Stevens, Felton; Samuel S. Kurita, Soquel, both of Calif.

[73] Assignee: Watkins-Johnson Company, Palo Alto, Calif.

[21] Appl. No.: 89,591

[22] Filed: Aug. 26, 1987

[51] Int. Cl.⁴ .............................................. B25J 11/00
[52] U.S. Cl. ................................. 414/744.5; 403/109; 414/8; 901/23; 901/21; 901/28
[58] Field of Search ....................... 901/16, 15, 17, 21, 901/23, 24, 28, 36, 38; 414/8, 744 R, 744 A, 744 B, 744 C; 403/109, 104, 59; 285/300, 302

[56] References Cited

U.S. PATENT DOCUMENTS 4,201,048 5/1980 Fisher et al. ................... 285/302 X
4,601,635 7/1986 Ito et al. ............................ 901/15 X

FOREIGN PATENT DOCUMENTS 188863 7/1986 European Pat. Off. .
668607 12/1938 Fed. Rep. of Germany .
154342 3/1982 Fed. Rep. of Germany .
3513638 10/1986 Fed. Rep. of Germany .
2143205 2/1985 United Kingdom .

Primary Examiner—Robert J. Spar
Assistant Examiner—Donald W. Underwood
Attorney, Agent, or Firm—Flehr, Hohbach, Test, Albritton & Herbert

[57] ABSTRACT

The foregoing and other objects of the invention are achieved by a drive system which includes a base and a support assembly for rotatably supporting one end of the first arm from said base and for raising and lowering the arm with respect to the base. A second arm has one end rotatably supported at the other end of the first arm and an effector mount is rotatably supported at the other end of the second arm. Drive structure mounted on said base rotate said support assembly. Drive structure mounted at the lower end of said support assembly raise and lower the arm. Drive structure for rotating said second arm and drive structure for rotating said effector are mounted at the upper end of said support. All of said drive structure are mounted within an enclosed housing.

9 Claims, 3 Drawing Sheets

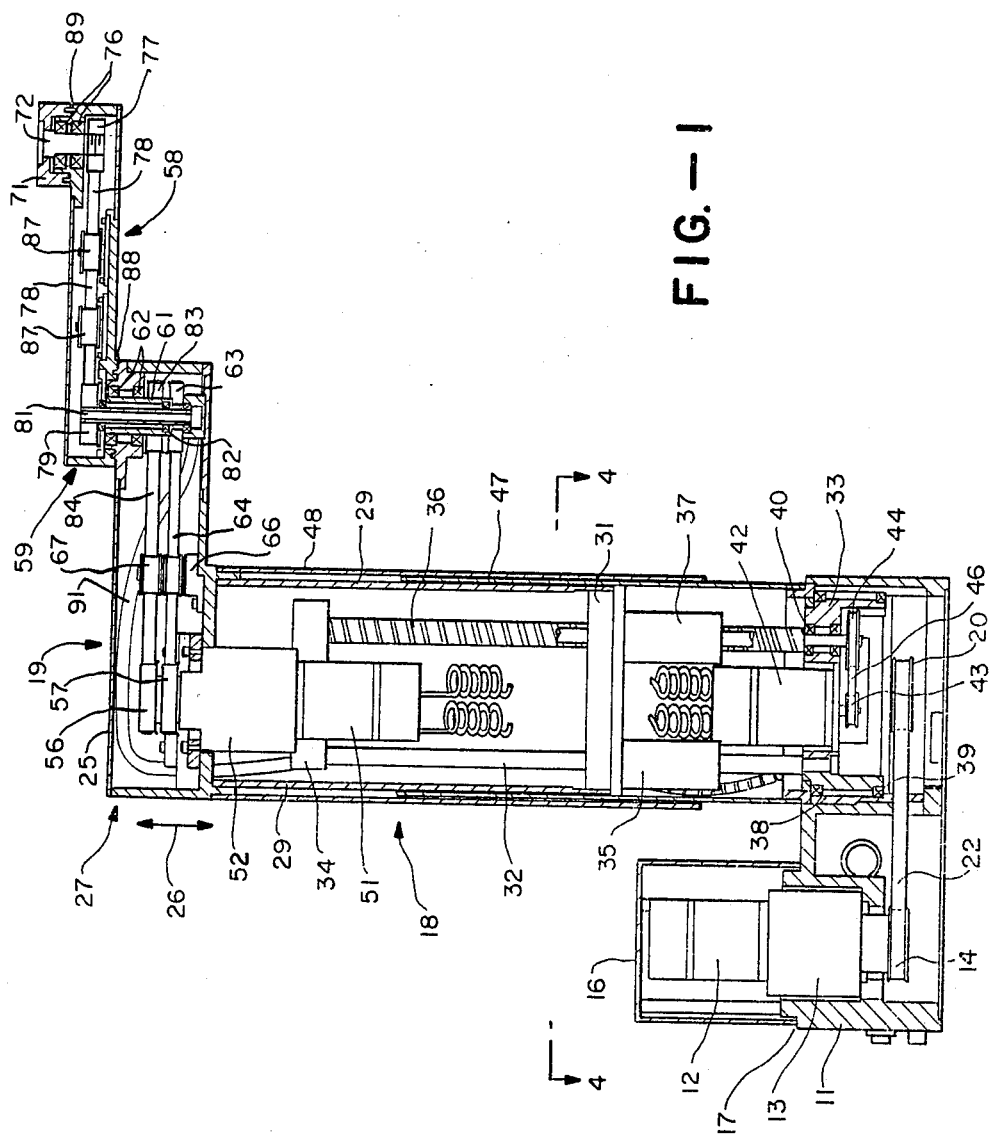
FIG.—1

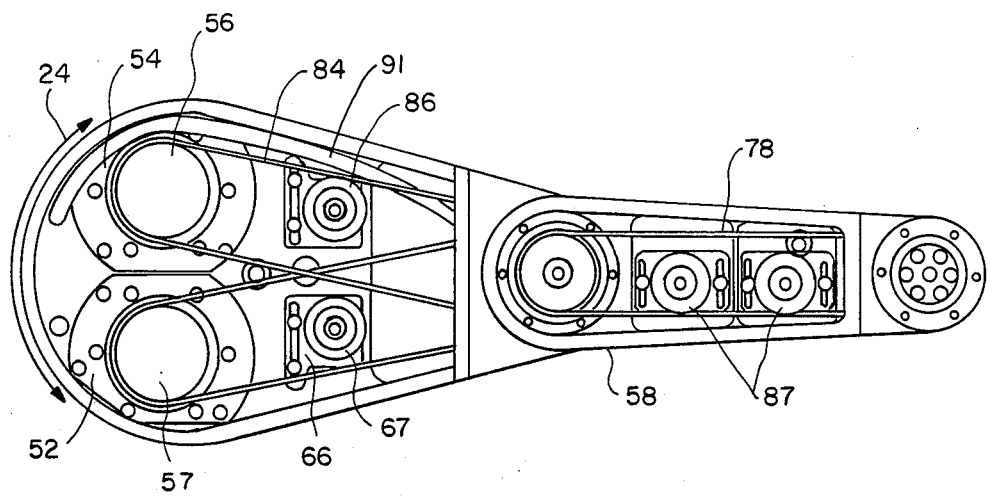
FIG.—2
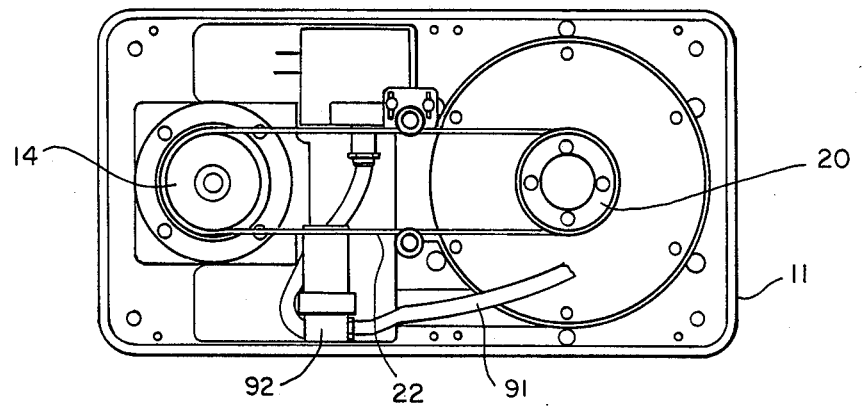
FIG.—3

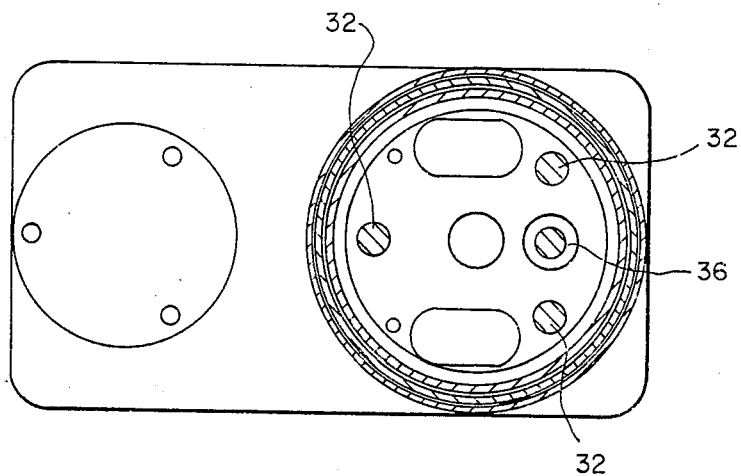
FIG.—4
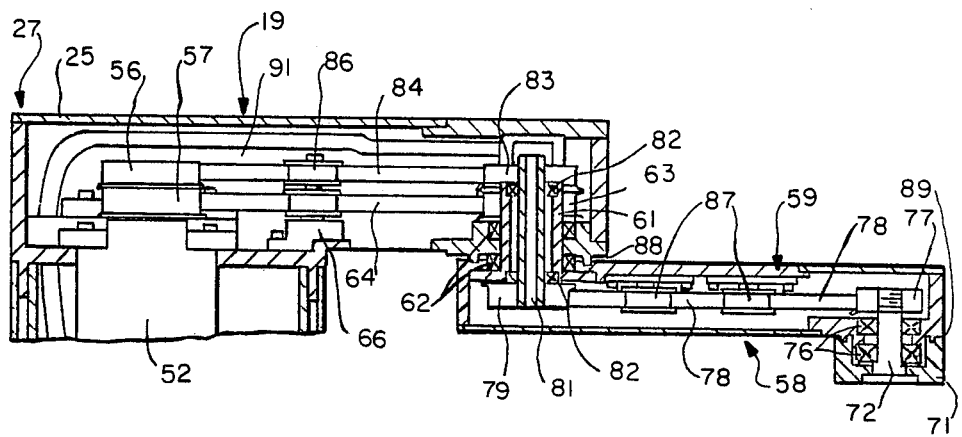
FIG.—5

INDUSTRIAL ROBOT FOR USE IN CLEAN ROOM ENVIRONMENT

The present invention relates to an industrial robot for use in clean room environment and more particularly to a robot for use in the manipulation of semiconductor wafers as they are processed to form semiconductor devices and circuits.

Conventional industrial robots generally have the capability of moving through six axes of movement to manipulate objects and parts under programmed motions and perform a variety of tasks.

One of the principal causes of contamination in the semiconductor industry is in the handling of wafers. Wafers are typically handled over forty times while being processed. It is therefore of utmost importance that the number of particles added to the clean room environment during each handling cycle be minimized.

It is an object of the present invention to provide a robot particularly suitable for use in clean room environment.

It is another object of the present invention to provide a robot for use in manipulating wafers in semiconductor processing.

It is a further object of the present invention to provide a robot in which the drive system is shielded from the surrounds.

The foregoing and other objects of the invention are achieved by a drive system which includes a base and a support assembly for rotatably supporting one end of the first arm from said base and for raising and lowering the arm with respect to the base. A second arm has one end rotatably supported at the other end of the first arm and an effector mount is rotatably supported at the other end of the second arm. Drive means mounted on said base rotate said support assembly. Drive means mounted at the lower end of said support assembly raise and lower the arm. Drive means for rotating said second arm and drive means for rotating said effector are mounted at the upper end of said support. All of said drive means are mounted within an enclosed housing.

The foregoing and other objects of the invention will be more clearly understood from the following description taken in conjunction with the accompanying drawings of which:

FIG. 1 is an elevational view, partly in section, of an industrial robot in accordance with the preferred embodiment of the present invention.

FIG. 2 is a top view of the robot shown in FIG. 1 with covers and internal wiring omitted for clarity.

FIG. 3 is a bottom view of the base with the base cover omitted to show the drive means.

FIG. 4 is a sectional view taken along the lines 4—4 of FIG. 1.

FIG. 5 is a partial view showing the second arm mounted in its alternative top position.

The robot includes a base 11, FIGS. 1 and 3, which supports a drive motor 12 and gear reducer 13 which drives pulley 14. A cover 16 is carried by the base and provides a housing for the motor and gear reducer. As will be presently described, the interior of the robot is maintained at a lower pressure than the exterior whereby air flows inwardly into the assembly to prevent escape of any contaminate particles resulting from wear within the drive members. The seal between the cover 16 and the base may be loosely fit whereby air flows through the tortuous passage forming labyrinth path 17.

A column assembly designated generally by numeral 18 supports a first arm designated by numeral 19. The column assembly includes drive pulley 20 which is driven by belt 22 reeved over pulley 14 to rotate the arm as illustrated by the arrow 24, FIG. 2. The lifting and lowering of the arm is shown by the arrow 26, FIG. 1.

The arm 19 includes a housing 27 which may include a cover plate 25 to form a sealed housing. The housing 27 is supported by a column 29 which is supported by a column support base 31. The column support base 31 is guided by spaced linear bearing shafts 32 which extend between the rotatable base 33 and top plate 34. Linear bearing 35 engages the bearing shafts 32. The column base 31 is driven by a lead screw 36 which engages and drives follower 37 secured to the bottom of the base 31. Rotation of the lead screw, therefore, raises and lowers the base 31 and, in turn, the arm 19 as shown at arrow 26.

The lead screw 36 is supported between the base 33 and end plate 34 by bearings, only the lower bearings 40 are shown. The bearings and the lead screw 36 are supported on the base 33 which is rotatably supported in the housing 11 by spaced bearings 38 and 39. The base 33 is driven by drive pulley 20. The motor 12 provides the motive force for rotation of the base 33 and, therefore, rotation of the linear bearing base 31 and the column 29. The motor may, for example, comprise a stepping motor which can be accurately driven by a digital drive circuit.

The base 33 also supports a motor 42 which drives pulley 43. The end of the lead screw includes a drive pulley 44. Drive belt 46 is reeved over the pulleys 43 and 44 drives the pulley 44 of the motor pulley 43 whereby the lead screw is rotated and the column 29 and arm 19 are caused to move vertically as shown by arrow 26.

A labyrinth seal is provided to seal the interior of the column including the moving parts, electrical lines and vacuum lines from the surrounds. For this purpose, the support column 29 is surrounded by a shield 47 which extends upwardly from the base and is closely spaced therefrom. A second shield 48 is carried by the housing 27 and extends downwardly and is closely spaced from the upwardly extending shield 47. Thus, the upwardly extending shield 47 is sandwiched between the column 29 and shield 48 and the space between the sandwich members provides a labyrinth passage whereby to effectively seal the interior from the exterior with any flow of air being from the exterior at higher pressure to the interior at a lower pressure. Thus, a single labyrinth seal is used for two degrees of motion, translational and rotational.

The arm housing 27 supports a pair of spaced motor and gear reducer assemblies 54, 52. Each of which drives an associated pulley 56, 57, respectively. The end of the arm 19 supports a second arm 58 which includes a housing 59. The arm 58 is supported by a hollow shaft 61 which is rotatably supported by the housing 27 by spaced bearings 62. A pulley 83 is secured to the hollow shaft and is driven by belt 84 reeved on pulley 56. An adjustable belt tightener 86 including an idler pulley 67 tensions the belt 84. Thus, the arm 58 is rotated by motor and gear reducer assembly 54, which may be a digitally controlled stepping motor or a servo motor. A laybrinth seal 88 is formed by the tortuous passage between the housing of the arms 19 and 58. The arm 58 supports a rotatable mounting means 71 to which can be attached an effectuator such as a pick-up assembly, clamp or the like which manipulates, grasps or otherwise controls a work piece or an associate semiconductor wafer.

The mounting means is supported by shaft 72 which is rotatably supported from the end of the arm 58 by spaced bearings 76. The end is sealed by labyrinth seal 89. The other end of the shaft is provided with a drive pulley 77. The drive pulley is driven by belt 78 driven from pulley 79 attached to the end of the shaft 81. The shaft 81 is rotatably supported in the hollow shaft 61 by spaced bearings 82. The other end of the shaft is provided with a pulley 63 driven by belt 64 which is driven by pulley 57. Tensioning means 87 and 66 are provided for the belts 78 and 64, respectively. All of the drive motors and gear reducers are enclosed within the base housing and columnar housing. The drive belts and pulleys are also all enclosed within the arm housings. Labyrinth passages 88 and 89 formed at the joints permit a lower pressure within the housing.

Suitable means are provided for maintaining a lower pressure within the housing than in the exterior whereby air flows inwardly from the clean surrounds into the interior of the robot thereby preventing contamination of the surrounds by any debris, particles, or the like generated by the moving parts.

There is provided a vacuum fitting, not shown, for connecting to a vacuum source for maintaining the interior at low pressure. Also provided is a vacuum line 91 which extends from solenoid valve 92, FIG. 3, to the mounting means 72 to operate an associated effector.

The robot described is the preferred embodiment and has all of its joints below the effectuator which would manipulate a wafer and thereby prevents any particle not blocked by the labyrinth seals from dropping on the wafer being manipulated.

This is advantageous because it keeps all moving mechanisms below the substrate or wafer and minimizes the disturbance to clean air flow. It also insures that the wafer is not impinged by particles generated by the moving mechanism.

Another embodiment is shown in FIG. 5. The hollow shaft 61 which supports the arm 58 extends downwardly with the arm 58 mounted below the arm 19. It is seen that operation and drive of the arm is as described above and like reference numerals have been applied to like parts with the exception that the role of pulleys 62, 83 and belts 64, 84 have been reversed. This configuration may be useful in many other applications such as electronic assembly.

There has been provided a simplified industrial robot in which all moving parts are housed within a housing which is sealed by labyrinth seals and can be maintained at lower pressure. The construction, including the dual purpose labyrinth seal for elevation and rotation occupies a minimum floor space. The preferred configuration can manipulate parts (wafers) over a large area with minimum rotational movement of the arms.

What is claimed is:

1. An industrial robot comprising:
   a base;
   a first arm;
   an arm support assembly including a hollow support column for rotatably supporting one end of said first arm from said base and for raising and lowering the arm with respect to the base;
   a second arm having an end rotatably supported at the other end of said first arm;
   effectuator mounting means rotatably mounted at the other end of said second arm;
   first drive means mounted on said base for rotating said arm support assembly;
   second drive means mounted on said arm support assembly for raising and lowering the arm;
   third drive means for rotating said second arm at the end of said first arm; and
   fourth drive means for rotating said effectuator, said third and fourth drive means each including a motor mounted in said hollow support column of said arm support assembly; and
   a cylindrical sleeve mounted on said base and extending upwardly adjacent to and surrounding said hollow support column to permit said arm support assembly to rotate and raise and lower while maintaining a seal.

2. An industrial robot as in claim 1 which includes a labyrinth seal at the joint between said first and second arms.

3. An industrial robot comprising:
   a base housing;
   a support base rotatably supported in said base housing;
   means in said base housing for rotating said support base;
   linear bearing shafts supported by said support base;
   a column support linearly guided by said linear bearing shafts;
   a lead screw supported on said support base;
   a follower engaging said lead screw and moving said column support;
   a first arm;
   a hollow support column extending between said column support and said arm to support and raise and lower said arm as the column support is moved by the lead screw;
   a second arm rotatably supported by said first arm;
   means including drive means in said support column for rotating said second arm;
   a cylindrical sleeve coaxial with and spaced from said support column and mounted for movement therewith; and
   a second sleeve supported by said base housing and extending between said support column and cylindrical sleeve to provide a labyrinth seal.

4. An industrial robot as in claim 3 wherein said means for rotating said second arm includes a hollow shaft rotatably supported at the end of said first arm, a motor mounted in said hollow support column and belt drive means extending between the motor and hollow shaft.

5. An industrial robot as in claim 3 or 4 including means for receiving an effectuator rotatably mounted at the end of said second arm; and
   means including a motor mounted in said hollow support column and belt drive means for rotating said effectuator receiving means.

6. An industrial robot as in claim 3 in which said second arm is mounted above said first arm.

7. An industrial robot as in claim 3 including support base drive means including a motor for rotating said support base.

8. An industrial robot as in claim 7 in which lead screw drive means including a motor rotates said lead screw.

9. An industrial robot as in claim 5 including a housing surrounding all parts of the robot; and labyrinth seals at said rotating joint between the arms and the second arm and effectuator.

* * * * *